United States Patent
Jabori et al.

(10) Patent No.: US 11,226,918 B2
(45) Date of Patent: Jan. 18, 2022

(54) BLOCKING SYSTEMS FROM RESPONDING TO BUS MASTERING CAPABLE DEVICES

(71) Applicant: Hewlett-Packard Development Company, L.P., Spring, TX (US)

(72) Inventors: Monji G Jabori, Houston, TX (US); Wei Ze Liu, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/482,445

(22) PCT Filed: Dec. 8, 2017

(86) PCT No.: PCT/US2017/065317
§ 371 (c)(1),
(2) Date: Jul. 31, 2019

(87) PCT Pub. No.: WO2019/112606
PCT Pub. Date: Jun. 13, 2019

(65) Prior Publication Data
US 2020/0320030 A1    Oct. 8, 2020

(51) Int. Cl.
| G06F 13/364 | (2006.01) |
| G06F 1/3215 | (2019.01) |
| G06F 13/16 | (2006.01) |
| G06F 13/40 | (2006.01) |
| G06F 21/85 | (2013.01) |

(52) U.S. Cl.
CPC ......... *G06F 13/364* (2013.01); *G06F 1/3215* (2013.01); *G06F 13/1668* (2013.01); *G06F 13/4063* (2013.01); *G06F 21/85* (2013.01)

(58) Field of Classification Search
CPC ............ G06F 13/364; G06F 13/1668; G06F 13/4063; G06F 1/3215; G06F 21/85
See application file for complete search history.

(56) References Cited

U.S. PATENT DOCUMENTS

| 5,528,767 A | 6/1996 | Chen |
| 6,098,132 A * | 8/2000 | Olarig ................. G06F 13/4081 710/302 |
| 7,506,086 B2 | 3/2009 | Mayer |
| 8,650,440 B2 | 2/2014 | Rohleder et al. |
| 2005/0144476 A1 | 6/2005 | England et al. |
| 2008/0071953 A1* | 3/2008 | Kershaw ............ G06F 12/1491 710/110 |
| 2010/0169599 A1* | 7/2010 | Natu ....................... G06F 21/71 711/163 |

(Continued)

OTHER PUBLICATIONS

Bus-Master Devices, http://uw714doc.sco.com/en/HDK_concepts/ddT_busmast.html.

(Continued)

*Primary Examiner* — Nimesh G Patel
(74) *Attorney, Agent, or Firm* — Trop Pruner & Hu PC

(57) ABSTRACT

In some examples, a system includes a memory resource, a communication channel to allow a bus mastering capable device to access the memory resource, and a controller to block the system from responding to a request from the bus mastering capable device for accessing the memory resource until the controller has authorized the bus mastering capable device.

18 Claims, 3 Drawing Sheets

(56) References Cited

U.S. PATENT DOCUMENTS

| | | | |
|---|---|---|---|
| 2010/0214304 A1* | 8/2010 | Jonas | G06F 12/1441 345/541 |
| 2011/0093639 A1 | 4/2011 | Richards | |
| 2013/0219452 A1* | 8/2013 | Liu | G06F 21/00 726/1 |
| 2014/0115209 A1 | 4/2014 | Heinrich et al. | |
| 2014/0366131 A1* | 12/2014 | Lai | G06F 21/85 726/21 |
| 2015/0234760 A1* | 8/2015 | Kimura | G06F 11/0757 710/110 |
| 2016/0091957 A1* | 3/2016 | Partiwala | G11C 7/1072 713/323 |
| 2019/0034627 A1* | 1/2019 | Hall | G06F 21/556 |

OTHER PUBLICATIONS

Ravi Budruk, An Introduction to PCI Express downloaded Nov. 7, 2017 (18 pages).
Sopto, What is a PCI Express Root Port? downloaded Nov. 7, 2017 (3 pages).
Wikipedia, Bus mastering last edited Nov. 10, 2017 (1 page).
Wikipedia, Direct memory access last edited Nov. 5, 2017 (5 pages).
Wikipedia, Schmitt trigger last edited Nov. 7, 2017 (7 pages).

* cited by examiner

BLOCKING SYSTEMS FROM RESPONDING TO BUS MASTERING CAPABLE DEVICES

BACKGROUND

A computer system can include various electronic components, such as a processor, a memory, an input/output (I/O) device, and so forth. A bus can be provided over which various electronic components are able to communicate.

BRIEF DESCRIPTION OF THE DRAWINGS

Some implementations of the present disclosure are described with respect to the following figures.

Figure 1:
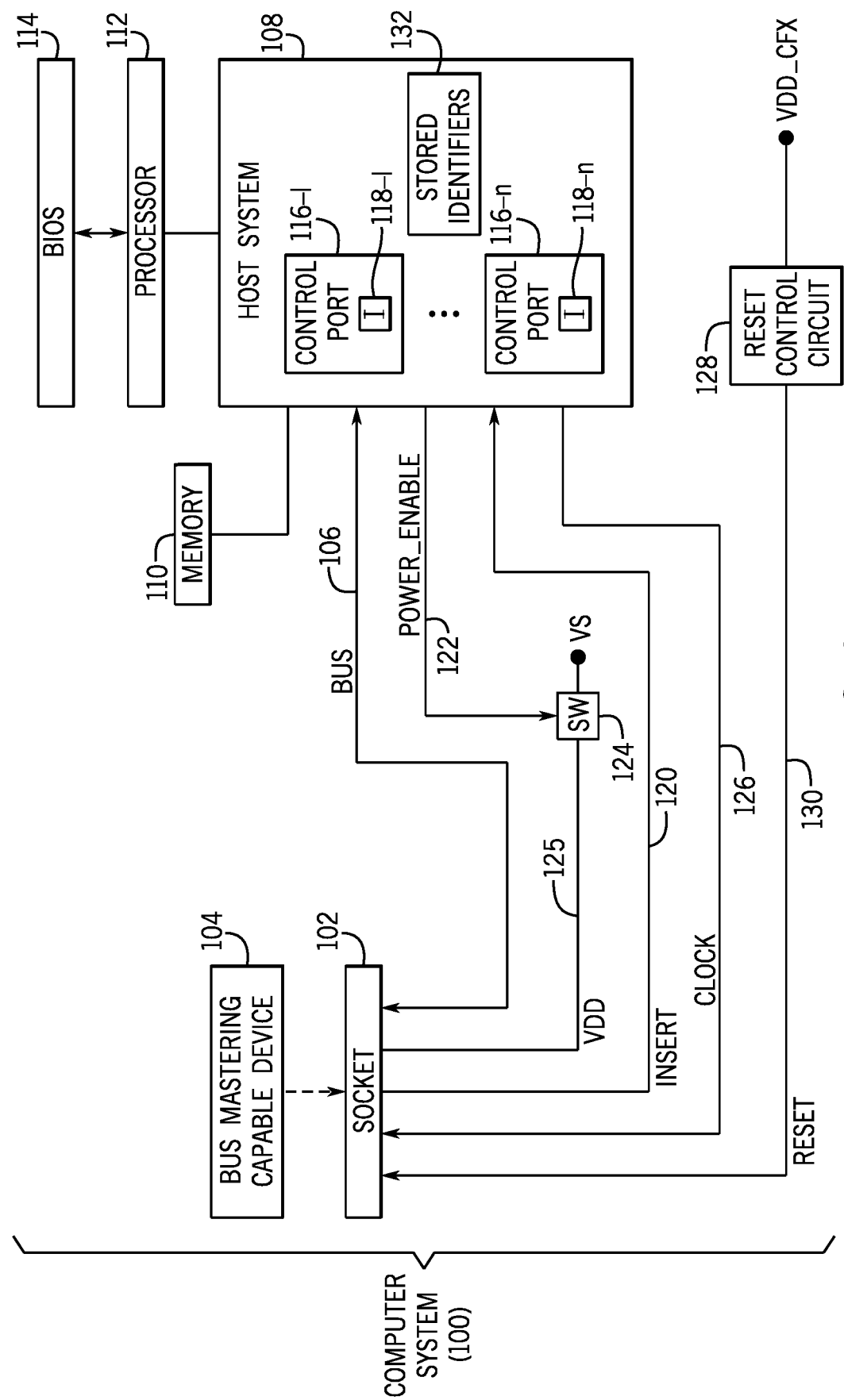
FIG. 1 is a block diagram of a computer system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A bus mastering capable device is a device that is able to initiate an access to a memory resource in a system independent of a processor of the system. A "processor" of a system can refer to a main processing resource of the system, where machine-readable instructions such as system firmware, an operating system, and application programs, are executable on the main processing resource. Examples of a processor can include any or some combination of a microprocessor, a core of a multi-core microprocessor, a microcontroller, a programmable integrated circuit, a programmable gate array, or another hardware processing circuit.

A bus mastering capable device is capable of acting as a master on a bus for the purpose of issuing a memory request over the bus to directly access a memory resource accessible over the bus. A "bus" can refer to any communication channel that allows one device to communicate with another device. A "memory resource" can refer to a memory or a portion of a memory, where a memory can include a single memory device or a collection of memory devices. A memory device can include any or some combination of the following: a dynamic random access memory (DRAM) device, a static random access memory (SRAM) device, a solid state memory device, a disk drive, and so forth.

A request from a bus mastering capable device can be issued at a physical (PHY) level, which is at the hardware level below software or firmware levels. A software level refers to a level of a system that includes a software program (or multiple software programs). A firmware level refers to a level of a system that include a firmware program (or multiple firmware programs). A software program or firmware program can include machine-readable instructions.

A request from a bus mastering capable device issued at the physical level to gain access to a memory resource may not be detectable at a software or firmware level. As a result, a malicious bus mastering capable device inserted into a system may access a memory resource that the malicious bus mastering capable device is not authorized to access. A "malicious" bus mastering capable device refers to any bus mastering capable device that may access a memory resource that the bus mastering capable device should not.

In accordance with some implementations of the present disclosure, a computer system is able to initially block access by a bus mastering capable device of a memory resource until the computer system is able to authorize the bus mastering capable device. The blocking is performed by logic (in the form of machine-readable instructions and/or a hardware logic) that is separate from the bus mastering capable device. In some examples, the blocking is performed upstream of the bus mastering capable device. A component that is upstream of the bus mastering capable device on a bus refers to a component that the bus mastering capable device has to interact with to access the memory resource.

In some examples, the initial blocking of access of the memory resource by the bus mastering capable device is at a root port for the bus mastering capable device. The "root port" for a bus mastering capable device can refer to a control portion of a host system in the computer system. A host system can refer to a chipset that provides various functionalities of the computer system, including any or some combination of the following: a memory control functionality to control access of a memory, an input/output (I/O) control functionality to control operation of I/O devices, a graphics control functionality to provide control of presentation of graphics in a display device, and so forth. A chipset can include an integrated circuit (IC) chip or a collection of IC chips. For example, an IC chip (or multiple IC chips) can include any or some combination of the following: a system-on-a-chip (SOC), a northbridge controller, a southbridge controller, a memory hub controller, an I/O hub controller, and so forth.

FIG. 1 is a block diagram of an example computer system 100 according to some implementations. Examples of the computer system 100 can include a desktop computer, a notebook computer, a tablet computer, a smartphone, a game appliance, a computer in a vehicle, a home appliance, a server computer, a communication node, a storage system, and so forth.

The computer system 100 includes a socket 102 that is able to receive a bus mastering capable device 104. A "socket" can refer to any type of a receiving structure, such as a connector, that can connect (electrically, optically, or otherwise) to a connection interface (e.g., an interface including pins or other connecting structures) of a device.

In some examples, the bus mastering capable device 104 is hot pluggable in the socket 102. A hot pluggable device refers to a device that can be plugged into or removed from the computer system 100 while power is maintained to the computer system 100. Upon insertion of a hot pluggable device, the computer system 100 can detect the device, supply power and a clock signal to the device, and can perform other configuration tasks with respect to the device.

In other examples, the bus mastering capable device 104 is not hot pluggable, but instead, is plugged into the socket 102, or permanently connected to the socket 102, while the computer system 100 is powered off.

Although FIG. 1 just shows one socket 102 to receive the corresponding bus mastering capable device 104, it is noted that in further examples, the computer system 100 can include multiple sockets to receive respective devices, some of which may be bus mastering capable devices.

The bus mastering capable device 104 can include an I/O device, such as a network interface controller, a graphics controller, a storage device controller, and so forth. The bus mastering capable device 104 when connected to the socket 102 is capable of communicating over a bus 106. The socket 102 is connected to the bus 106, which can further be connected to any other sockets that are able to receive respective devices.

The bus 106 is also connected to a host system 108. The host system 108 can include a component or arrangement of components that performs various functionalities with respect to the computer system 100. For example, the host system 108 can include a chipset that provides any one or some combination of the following functionalities: a memory control functionality, an I/O control functionality, a graphics control functionality, and so forth.

The memory control functionality of the host system 108 can manage access of a memory 110. For example, access of the memory 110 can be requested by a processor 112 that is connected to the host system 108, or requested by the bus mastering capable device 104 over the bus 106.

In some examples, the bus 106 is a Peripheral Component Interconnect-Express (PCI Express) bus, where devices communicate according to the PCI Express protocol. In other examples, the bus 106 can be according to a different communication protocol.

The bus 106 can include a data portion and a control portion. The data portion of the bus 106 is used to communicate data between components, while the control portion of the bus 106 is used to communicate control signals. A "portion" of a bus can refer to an electrically conductive trace or any other type of communication path.

The computer system 100 further includes a Basic Input Output System (BIOS) 114, which can perform booting of the computer system 100. The booting of the computer system 100 is performed when the computer system 100 is first started, such as in response to initial application of power or a reset of the computer system 100. The booting of the computer system 100 includes an initialization of the computer system 100, a configuration of devices in the computer system 100, and a loading of an operating system in the computer system 100.

The BIOS 114 can be considered to be part of system firmware, which is implemented as machine-readable instructions. System firmware can refer to a program (or a collection of programs) that performs various initial tasks of the computer system 100, such as the booting of the computer system 100. In some examples, the BIOS 114 includes Unified Extensible Firmware Interface (UEFI) firmware.

The processor 112 or the bus mastering capable device 104 can issue a memory access request, which can be received by the host system 108. In response to the memory access request, a memory control functionality of the host system 108 issues a corresponding command (or series of commands) to the memory 110 to perform the requested memory access operation, which can include a memory read operation or a memory write operation.

The host system 108 also includes a control port 116-1 that is used to manage the bus mastering capable device 104 if inserted into the socket 102. The control port 116-1 includes a control indicator 118-1, which can be an indicator stored in a control register of the control port 116-1, for example. The control indicator 118-1 can be implemented as a bit or a combination of bits of the control register. The control indicator 118-1 can be selectively set to different values to control whether or not the host system 108 is to respond to a memory access request from the bus mastering capable device 104. If the control indicator 118-1 is set to a first value, then the host system 108 is blocked from responding to a memory access request from the bus mastering capable device 104 received over the bus 106. However, if the control indicator 118-1 is set to a second value that is different from the first value, then the host system 108 is allowed to respond to a memory access request received over the bus 106 for accessing the memory 110.

In further examples, the control port 116-1 can include other control indicators to control other aspects of the bus mastering capable device 104.

The host system 108 further includes another control port 116-$n$, where n>1. The control port 116-$n$ includes a control indicator 118-$n$ that can similarly control whether or not the host system 108 responds to a memory access request from another bus mastering capable device (which may be coupled to the bus 106 through another socket not shown).

In some examples, each control port 116-1 to 116-$n$ is a root port.

In some examples, the setting of the value of a control indicator (118-1 or 118-$n$) can be by a processor 112 under the control of the BIOS 114 that executes on the processor 112. In other examples, the setting of the value of a control indicator (118-1 or 118-$n$) can be by the processor 112 under the control of another program. In further examples, the setting of the value of a control indicator (118-1 or 118-$n$) can be performed by a hardware logic, which can be part of the host system 108 or separate from the host system 108.

In addition to the bus 106, FIG. 1 shows various other signals that are connected to the socket 102, including a VDD signal 125, an Insert signal 120, a Clock signal 126, and a Reset signal 130. These signals can be considered sideband signals that are separate from the bus 106. Alternatively, some of these signals can be considered to be part of the bus 106.

The Insert signal 120 is provided from the socket 102 to the host system 108. If the socket 102 is empty (i.e., the bus mastering capable device 104 is not inserted in the socket 102), then the Insert signal 120 is in an inactive state. However, if the bus mastering capable device 104 is inserted into the socket 102, then the Insert signal 120 is set to an active state. An inactive state of a signal can refer to the signal being set to a low or high value, while an active state of the signal can refer to the signal being set to the other of the low or high value.

The host system 108 detects the insertion of the bus mastering capable device 104 based on the Insert signal 120 being set to the active state.

Once the host system 108 detects the presence of the bus mastering capable device 104, based on the Insert signal 120 being set to an active state, then the host system 108 can enable power to the socket 102 and can also perform a configuration procedure with respect to the bus mastering capable device 104. Power is enabled to the socket 102 by setting a Power_Enable signal 122 to an active state. Setting the Power_Enable signal 122 to an active state turns on a switch 124, while setting the Power_Enable signal 122 to an inactive state turns off the switch 124.

The switch 124 when turned on connects a power supply voltage, VS, to the VDD signal 125 that is supplied to the socket 102. The VDD signal 125 is the device supply voltage that is supplied to power the bus mastering capable device 104. The power supply voltage, VS, is provided from a power supply (not shown) of the computer system 100. The power supply can include a battery and/or a circuit that is connected to an external power source (e.g., a wall outlet power source).

In response to detecting the presence of the bus mastering capable device 104, the host system 108 also activates the Clock signal 126 that is provided to the socket 102. The Clock signal 126 is an oscillating signal that when active allows the bus mastering capable device 104 to perform its operations in a synchronous manner with respect to the host system 108.

The computer system 100 also includes a reset control circuit 128, which provides a Reset signal 130 to the socket 102. The Reset signal 130 is set to an active state or an inactive state based on a state of a VDD_CFX voltage, which can be controlled by the BIOS 114 in some examples. Once the BIOS 114 detects insertion of the bus mastering capable device 104 in the socket 102, based on information provided by the host system 108 responsive to the Insert signal 120 being set to an active state, the BIOS 114 can enable VDD_CFX to the reset control circuit 128, which in turn sets the Reset signal 130 to an inactive state to allow the bus mastering capable device 104 to transition out of a reset state. On the other hand, if VDD_CFX is disabled, then the reset control circuit 128 maintains the Reset signal 130 in an active state to maintain the bus mastering capable device 104 in a reset state, such that the bus mastering capable device 104 cannot operate.

By blocking or allowing access of the memory 110 by the bus mastering capable device 104 based on use of the control indicator 118-1 at the host system 108, which is upstream of the bus mastering capable device 104 on the bus 106, the computer system 100 is able to prevent a malicious bus mastering capable device from accessing the memory 110 until the computer system 100 (and more specifically, the BIOS 114 in some examples) has authorized the bus mastering capable device.

Blocking access of the memory 110 at the host system 108 can prevent unauthorized access of the memory 110 by a malicious bus mastering capable device that has its own power source (such as a battery) and that has its own clock signal and that can ignore an active state of the Reset signal 130. As a result, even if the Reset signal 130 is asserted to an active state, or the clock signal 126 is not provided to the bus mastering capable device 104, or the VDD signal 125 is inactive, a malicious bus mastering capable device with its own power source and clock signal and that can disregard an active Reset signal 130 can still issue a memory access request over the bus 106 to the host system 108 to access the memory 110. By performing the blocking of the memory 110 at the host system 108, the host system 108 can disregard any memory access request from a malicious bus mastering capable device 104 received over the bus 106 until the bus mastering capable device has been authorized.

The authorizing of the bus mastering capable device 104 to ensure that the bus mastering capable device 104 is trusted can be performed by checking an identifier of the bus mastering capable device 104. In some examples, in response to the insertion of the bus mastering capable device 104 in the socket 102, the host system 108 can perform a configuration procedure with respect to the bus mastering capable device 104. The configuration procedure includes obtaining an identifier of the bus mastering capable device 104 in a configuration space of the bus mastering capable device 104. For example, the bus mastering capable device 104 can include a configuration register (which is part of the bus mastering device's configuration space) that stores an identifier of the bus mastering capable device 104.

The host system 108 during the configuration procedure can read this configuration register to retrieve the identifier of the bus mastering capable device 104. Different bus mastering capable devices can have different unique identifiers.

Note that the reading of the identifier of the bus mastering capable device 104, such as from the configuration space of the bus mastering capable device 104, does not rely on a bus mastering capability of the bus mastering capable device 104; in other words, to retrieve the identifier of the bus mastering capable device 104, the bus mastering capable device 104 does not have to behave as a bus master to write its identifier to the memory 110.

The obtained identifier of the bus mastering capable device 104 is then provided to the BIOS 114, which can compare the obtained identifier to stored identifiers 132, which can be stored in a storage location accessible by the host system 108. The stored identifiers 132 include identifiers of bus mastering capable devices that are authorized to access a memory resource in the computer system 100.

If the obtained identifier of the bus mastering capable device 104 matches any identifier in the stored identifiers 132, then the BIOS 114 can indicate that the bus mastering capable device 104 is authorized, and can set the control indicator 118-1 to the second value to allow a memory control functionality of the host system 108 to respond to a memory access request from the bus mastering capable device 104.

In contrast, if the obtained identifier of the bus mastering capable device 104 does not match any identifier in the stored identifiers 132, then the BIOS 114 can maintain the control indicator 118-1 at the first value to block the memory control functionality of the host system 108 from responding to a memory access request from the bus mastering capable device 104.

In alternative examples, instead of the BIOS 114 performing the comparing of the obtained identifier to the stored identifiers 132, a different program or a hardware circuit can perform the comparing and the setting of the control indicator 118-1.

Figure 2:
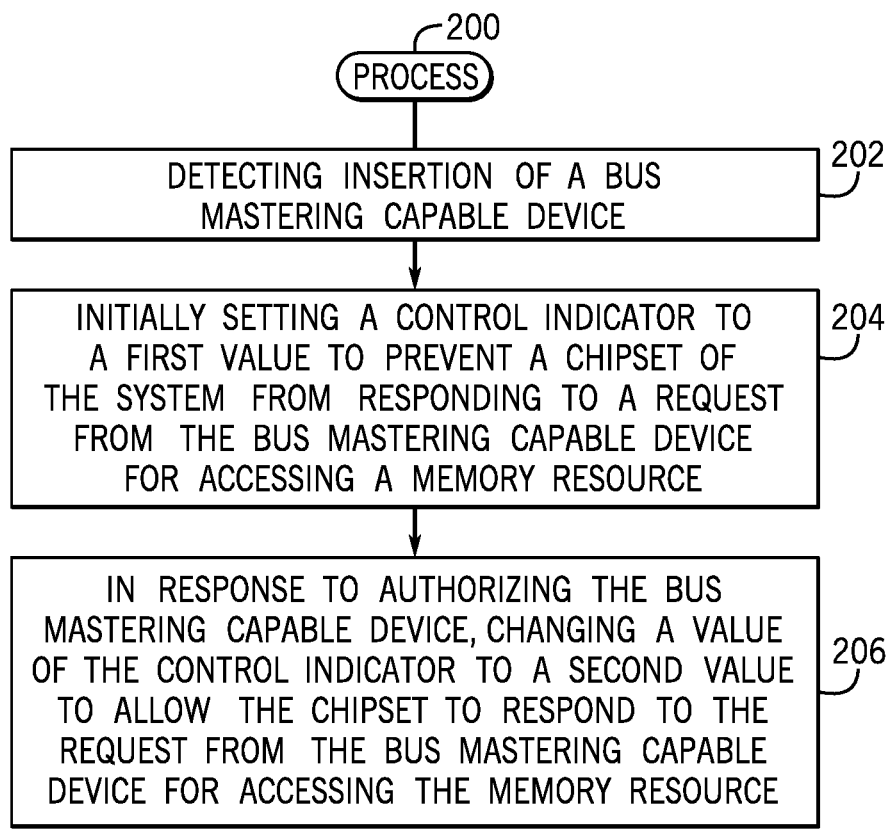
FIG. 2 is a flow diagram of a process according to some examples.

FIG. 2 is a flow diagram of a process 200 according to some implementations. The process 200 can be performed by a computer system, such as the computer system 100 of FIG. 1. More specifically, the process 200 can be performed by the BIOS 114 of FIG. 1 or by another component(s) in the computer system.

The process 200 includes detecting (at 202) insertion of a bus mastering capable device in the computer system. For example, this detection can be performed by the BIOS 114 in response to an indication provided by a chipset (such as the chipset of the host system 108) responsive to the Insert signal 120 of FIG. 1 being set to an active state when the bus mastering capable device 104 is inserted into the socket 102.

The process 200 further includes, initially setting (at 204) a control indicator (e.g., the control indicator 118-1 of FIG. 1) to a first value to prevent the chipset from responding to a request from the bus mastering capable device for accessing a memory resource. In some examples, the initial setting of the control indicator to the first value is in response to detecting the insertion of the bus mastering capable device, such as in the socket 102 (FIG. 1).

In other examples, the first value to which the control indicator is initially set can be a default value. In further examples, the initial setting of the control indicator to the first value can be performed as part of an initial starting of the computer system, such as during the booting of the computer system. Note that if there are multiple control indicators, the multiple control indicators can be initially set to the default first value or can be set to the first value during the initial starting of the computer system.

The process 200 also includes, in response to authorizing the bus mastering capable device, changing (at 206) a value of the control indicator to a second value to allow the chipset to respond to the request from the bus mastering capable device for accessing the memory resource.

Figure 3:
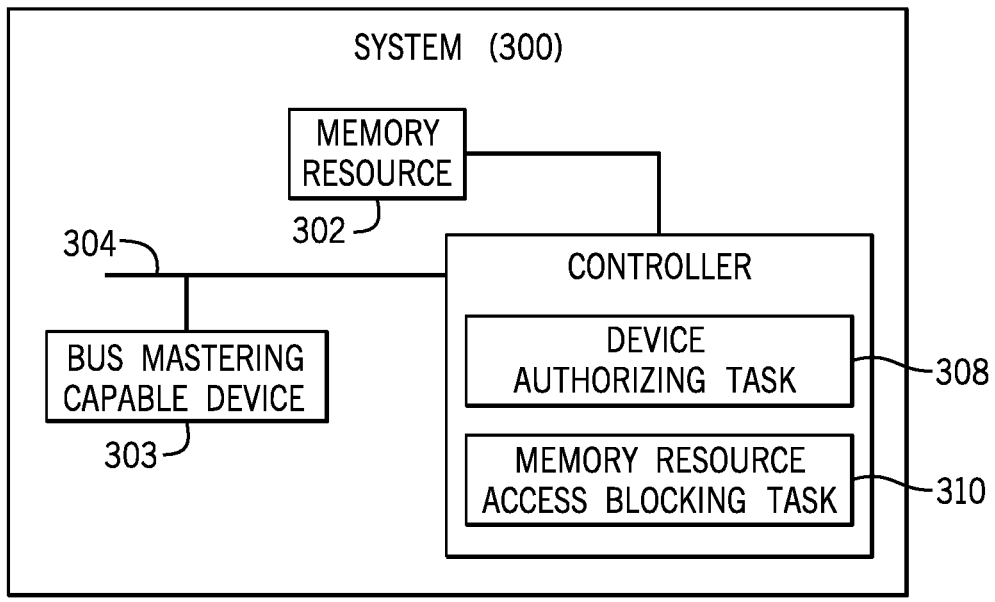
FIG. 3 is a block diagram of a system according to further examples.

FIG. 3 is a block diagram of a system 300 including a memory resource 302 and a communication channel 304 to allow a bus mastering capable device 303 to access the memory resource 302. A controller 306 is able to perform various tasks, including a device authorizing task 308 and a memory resource access blocking task 310 that blocks the system 300 from responding to a request from the bus mastering capable device 303 for accessing the memory resource 302 until the controller 306 has authorized the bus mastering capable device 303 (in the device authorizing task 308).

The controller 306 is to block the system 300 from responding to the request from the bus mastering capable device 303 for accessing the memory resource 302 while the controller 306 enables power to the bus mastering capable device 300 (such as by activating the Power_Enable signal 122 of FIG. 1), reads an identifier of the bus mastering capable device 303 from a configuration space of the bus mastering capable device 303, and compares the read identifier to stored identifiers (e.g., 132 in FIG. 1) to authorize the bus mastering capable device 303 if the read identifier matches any of the stored identifiers.

The controller 306 is to, in response to the identifier of the bus mastering capable device 303 not matching any of the stored identifiers, maintain the blocking of the system 300 from responding to the request from the bus mastering capable device 303 for accessing the memory resource 302, and removing power from the bus mastering capable device 303 (such as by deactivating the Power_Enable signal 122 of FIG. 1).

In some examples, the controller 306 can be implemented as a hardware processing circuit. In other examples, the controller 306 can be implemented as a combination of a hardware processing circuit and machine-readable instructions executable on the hardware processing circuit. In the latter example, the controller 306 can include the host system 108, the processor 112, and the BIOS 114 (or another program) of FIG. 1.

Figure 4:
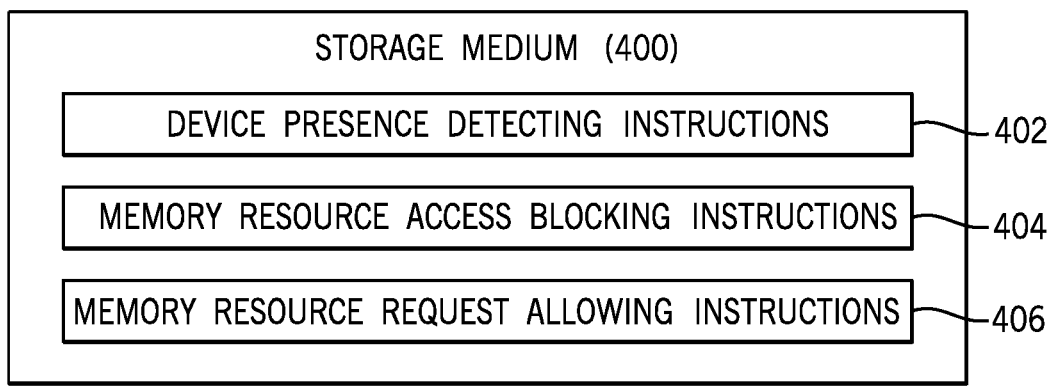
FIG. 4 is a block diagram of a storage medium storing machine-readable instructions according to additional examples.

FIG. 4 is a block diagram of a non-transitory machine-readable or computer-readable storage medium 400 that stores machine-readable instructions that upon execution cause a system to perform various tasks. The machine-readable instructions include device presence detecting instructions 402 to detect presence of a bus mastering capable device. The machine-readable instructions further include memory resource access blocking instructions 404 to initially block the system from responding to a request from the bus mastering capable device for accessing a memory resource.

The machine-readable instructions further include memory resource request allowing instructions 406 to, in response to authorizing the bus mastering capable device, allow the system to respond to the request from the bus mastering capable device for accessing the memory resource.

The storage medium 400 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a memory resource;
a communication channel to allow bus mastering capable devices to access the memory resource; and
a system firmware comprising a Basic Input Output System (BIOS) to:
detect an insertion of a first bus mastering capable device in the system;
in response to detecting the insertion, control a transition of a reset signal from an active state to an inactive state, the reset signal when in the active state to cause the first bus mastering capable device to be in a reset state, and the reset signal when in the inactive state to cause the first bus mastering capable device to be active on the communication channel; and
set control indicators to a first value to block the system from responding to a first request from the first bus mastering capable device for accessing the memory resource and block the system from responding to a second request from a second bus mastering capable device for accessing the memory resource until the BIOS has authorized the first and second bus mastering capable devices, the first request from the first bus mastering capable device sent on the communication channel after the reset signal has transitioned to the inactive state, and the second request from the second bus mastering capable device sent on the communication channel while the reset signal is in the active state.

2. The system of claim 1, comprising a register to store the control indicators each selectively settable to the first value and a second value, a first control indicator of the control indicators when set to the second value to allow the system to respond to the first request from the first bus mastering capable device for accessing the memory resource.

3. The system of claim 2, wherein the BIOS is to:
   initially set the control indicators to the first value; and
   after initially setting the control indicators to the first value, set the first control indicator to the second value in response to the BIOS authorizing the first bus mastering capable device.

4. The system of claim 3, wherein the BIOS is to initially set the first control indicator to the first value in response to detecting the insertion of the first bus mastering capable device in the system.

5. The system of claim 3, wherein the BIOS is to:
   after initially setting the control indicators to the first value, maintain a second control indicator of the control indicators at the first value in response to the BIOS failing to authorize the second bus mastering capable device.

6. The system of claim 5, wherein the control indicators are included in control ports of a chipset.

7. The system of claim 2, comprising a chipset including a memory control functionality for accessing the memory resource, and wherein in response to the first control indicator being set to the first value, the memory control functionality does not respond to the first request, issued over the communication channel, for accessing the memory resource.

8. The system of claim 1, wherein the BIOS is to authorize the first bus mastering capable device by comparing an identifier of the first bus mastering capable device with stored identifiers.

9. The system of claim 8, wherein the BIOS is to:
   in response to the insertion of the first bus mastering capable device in the system, enable power to the first bus mastering capable device; and
   read the identifier of the first bus mastering capable device without depending on a bus mastering capability of the first bus mastering capable device.

10. The system of claim 9, wherein the BIOS is to block the system from responding to the first request from the first bus mastering capable device for accessing the memory resource while the BIOS enables power to the first bus mastering capable device, reads the identifier, and compares the identifier.

11. The system of claim 8, wherein the BIOS is to:
    allow the system to respond to the first request from the first bus mastering capable device for accessing the memory resource in response to the identifier of the first bus mastering capable device matching one of the stored identifiers.

12. The system of claim 11, wherein the BIOS is to, in response to the identifier of the first bus mastering capable device not matching any of the stored identifiers:
    maintain the blocking of the system from responding to the first request from the first bus mastering capable device for accessing the memory resource; and
    remove power from the first bus mastering capable device.

13. A non-transitory machine-readable storage medium storing a Basic Input Output System (BIOS) that upon execution causes a system to:
    detect insertions of bus mastering capable devices in the system, the bus mastering capable devices including a first bus mastering capable device and a second bus mastering capable device;
    control a transition of a reset signal from an active state to an inactive state, the reset signal when in the active state to cause the first bus mastering capable device to be in a reset state, and the reset signal when in the inactive state to cause the first bus mastering capable device to be active on a communication channel;
    initially set control indicators to a first value to block the system from responding to a first request from the first bus mastering capable device for accessing a memory resource and block the system from responding to a second request from the second bus mastering capable device for accessing the memory resource, the first request from the first bus mastering capable device sent on the communication channel after the reset signal has transitioned to the inactive state, and the second request from the second bus mastering capable device sent on the communication channel while the reset signal is in the active state; and
    in response to authorizing, by the BIOS, the first bus mastering capable device, set a first control indicator of the control indicators to a second value to allow the system to respond to the first request from the first bus mastering capable device for accessing the memory resource.

14. The non-transitory machine-readable storage medium of claim 13, wherein the system comprises a chipset, and the control indicators are stored in the chipset.

15. A method comprising:
    detecting, by a Basic Input Output System (BIOS) executed on a processor in a system, insertions of bus mastering capable devices in the system, the bus mastering capable devices including a first bus mastering capable device and a second bus mastering capable device;
    controlling, by the BIOS, a transition of a reset signal from an active state to an inactive state, the reset signal when in the active state causing the first bus mastering capable device to be in a reset state, and the reset signal when in the inactive state causing the first bus mastering capable device to be active on a communication channel;
    initially setting, by the BIOS, control indicators to a first value to prevent a chipset of the system from responding to a first request from the first bus mastering capable device for accessing a memory resource and prevent the chipset from responding to a second request from the second bus mastering capable device for accessing the memory resource, the first request from the first bus mastering capable device sent on the communication channel after the reset signal has transitioned to the inactive state, and the second request from the second bus mastering capable device sent on the communication channel while the reset signal is in the active state; and
    in response to authorizing the first bus mastering capable device, changing, by the BIOS, a value of a first control indicator of the control indicators to a second value to allow the chipset to respond to the first request from the first bus mastering capable device for accessing the memory resource.

16. The method of claim 15, wherein the authorizing of the first bus mastering capable device comprises:
    obtaining an identifier of the first bus mastering capable device;
    comparing the identifier of the first bus mastering capable device to stored identifiers; and determining that the identifier of the first bus mastering capable device matches one of the stored identifiers.

17. The non-transitory machine-readable storage medium of claim 13, wherein the BIOS upon execution causes the system to maintain a second control indicator of the control indicators at the first value in response to detecting that the second bus mastering capable device is unauthorized.

18. The method of claim 15, comprising maintaining, by the BIOS, a second control indicator of the control indicators at the first value in response to detecting that the second bus mastering capable device is unauthorized.

* * * * *